United States Patent
Luo et al.

(10) Patent No.: US 8,476,882 B2
(45) Date of Patent: Jul. 2, 2013

(54) REFERENCE VOLTAGE BASED EQUIVALENT SERIES RESISTANCE (ESR) EMULATION FOR CONSTANT ON-TIME (COT) CONTROL OF BUCK REGULATORS

(75) Inventors: Jia Luo, Fremont, CA (US); Jon Cronk, Morgan Hill, CA (US); Chuong Nguyen, San Jose, CA (US)

(73) Assignee: Exar Corporation, Fremont, CA (US)

( * ) Notice: Subject to any disclaimer, the term of this patent is extended or adjusted under 35 U.S.C. 154(b) by 420 days.

(21) Appl. No.: 12/895,555

(22) Filed: Sep. 30, 2010

(65) Prior Publication Data

US 2012/0081094 A1    Apr. 5, 2012

(51) Int. Cl.
*G05F 1/40*    (2006.01)
(52) U.S. Cl.
USPC .......................................................... 323/282
(58) Field of Classification Search
USPC .................. 323/222–225, 268, 271, 282, 285
See application file for complete search history.

(56) References Cited

U.S. PATENT DOCUMENTS

| | | | |
|---|---|---|---|
| 6,871,289 B2 * | 3/2005 | Pullen et al. | 713/300 |
| 7,045,993 B1 * | 5/2006 | Tomiyoshi | 323/224 |
| 7,432,689 B2 * | 10/2008 | Miller et al. | 323/259 |
| 7,714,547 B2 | 5/2010 | Fogg et al. | |
| 8,076,917 B2 * | 12/2011 | Feng et al. | 323/282 |
| 8,294,439 B2 * | 10/2012 | Lu et al. | 323/271 |

OTHER PUBLICATIONS

Dostal, "Emulated Ripple Technique Advances Hysteretic Switchmode Supplies", Power Management Design Line, Feb. 25, 2008, 3 pages.
Sipex, "High Efficiency 400mA Synchronous Buck Regulator", Dec. 23, 2005, 14 pages.

* cited by examiner

*Primary Examiner* — Matthew Nguyen

(57) ABSTRACT

The present invention uses a reference voltage that varies within a Pulse Width Modulation (PWM) cycle to generate the PWM signal. This allows for stability in the feedback of Constant On-Time (COT) control for buck controllers when low Equivalent Series Resistance (ESR) capacitors are used as the output capacitor. The reference voltage is adjusted using features of a PWM cycle in a voltage mode without using external inductor current information.

24 Claims, 10 Drawing Sheets

REFERENCE VOLTAGE BASED EQUIVALENT SERIES RESISTANCE (ESR) EMULATION FOR CONSTANT ON-TIME (COT) CONTROL OF BUCK REGULATORS

FIELD OF THE INVENTION

The present invention relates to the stabilization of Constant On-Time (COT) control buck regulators. More particularly, the present invention relates to the stabilization of COT control buck regulators that use a low Equivalent Series Resistance (ESR) output capacitor.

BACKGROUND

Buck regulators are a type of DC/DC controller that are used to convert a DC voltage to another lower DC voltage. The buck regulator chip is connected to an external LC circuit that includes an inductor and an output capacitor. An external voltage divider produces a feedback voltage. Typically, Pulse Width Modulation (PWM) signal(s) are created by the buck regulator to control the switching of an input voltage into the LC circuit. The PWM signal(s) may be composed of, or used to create, control signals for high-side and low-side switches for power and ground into the LC circuit to produce the DC output voltage. The larger the duty cycle of the high side PWM signal, the greater the DC output voltage.

The feedback voltage is compared to a constant reference voltage to adjust the PWM signal(s). If the feedback voltage, and thus the output voltage, is too low or high, the duty cycle of the high side PWM signal is increased or decreased.

Technology development for ceramic capacitors has made them the capacitor of choice for output capacitors in DC/DC converters. Energy density and cost reductions have made them practical and cost effective for output voltages of 5V and below. However, ceramic capacitors have a very low equivalent series resistance (ESR) and result in unstable operation with standard Constant On-Time (COT) control schemes.

Most COT DC/DC controllers rely on the ESR of the output capacitor to stabilize the buck system. The ESR of the output capacitor has dramatic phase correction effect and is capable of compensating for the phase lag of the buck regulator's LC circuit. When COT DC/DC controllers are used with low ESR ceramic capacitors, they have required either an additional resistor added in series with the output capacitor, a Resistor-Capacitor (RC) circuit feeding from the switch node to the feedback voltage, or a resistor in series with the inductor together with a RC circuit filter to stabilize the system. These extra components increase the cost, component count, and reduce efficiency. Further, when an additional resistor in series with the output capacitor is used (the simplest and cheapest method), the output voltage ripple increases and the transient response is degraded.

SUMMARY

The present invention allows for the use of COT control in a buck regulator using a low ESR capacitor. It overcomes the drawbacks of prior systems while maintaining the fast transient response and stability of constant on-time control.

A reference voltage is compared to the feedback voltage to create the PWM signal(s). Rather than use a constant reference voltage, as in the prior art, the present invention uses a reference voltage that varies within a PWM cycle. This allows for stability in the feedback of COT control for the buck regulator. In effect, a ripple is put on the reference voltage that allows the buck regulator to compensate for the phase lag induced on the feedback voltage by the external LC circuit.

The reference voltage generating circuitry is switched based on features of the PWM cycle, such as $T_{on}$, when the PWM signal goes high, and $T_{off}$, when the PWM signal goes low. Systems of the present invention do not require sensing a ramp portion of the external inductor current.

DESCRIPTION OF THE EMBODIMENTS

The difficulty of stabilizing a COT controlled buck regulator is due to the phase lag introduced by the LC network. When the output voltage becomes phase shifted sufficiently from the inductor current, the system becomes instable.

Figure 1A:
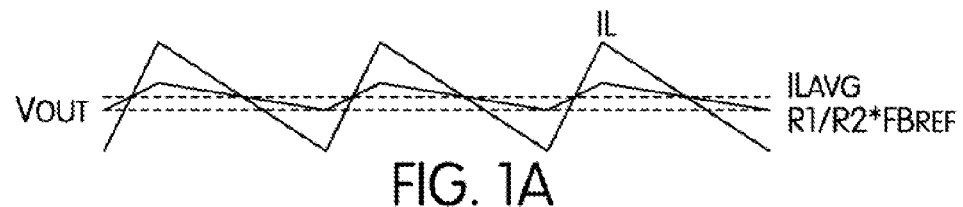
FIGS. 1A-1E show examples of inductor currents and output voltages of buck regulators.
Figure 1B:
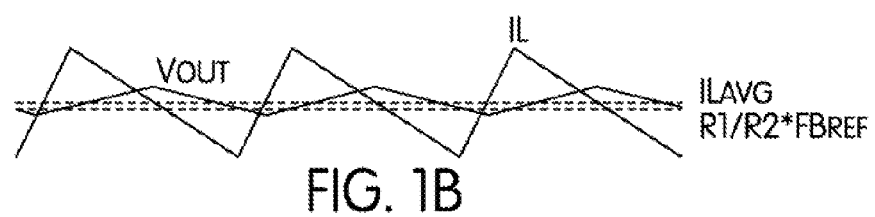

FIG. 1B shows the inherent phase lag between inductor current ($I_L$) and output voltage ($V_{out}$). To simplify the $2^{nd}$ order system of the LC system network, all $V_{out}$ waveforms in this description are shown as a $1^{st}$ order system with straight lines.

Figure 1C:

The system regulation point is set by the reference voltage ($FB_{ref}$ or $V_{ref}$). The feedback voltage is compared to the reference voltage within the buck regulator. As a result of the external resistor divider between the output voltage and the feedback voltage, when $V_{out}$ is lower than approximately $FB_{ref}*(R1+R2)/R1$, the system turns on the high side switch as shown in FIG. 1C.

Figure 1D:
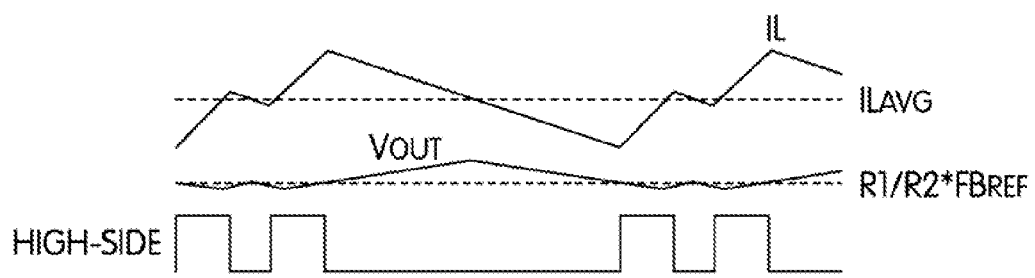

However, as a result of the phase lag, it is possible for $V_{out}$ to be higher than $FB_{ref}*(R1+R2)/R1$ when the high side switch is turning OFF. Therefore, another high-side-switch-turn-on may occur immediately after the high side switch turns off. The system will thus jump into an instable double pulse or triple pulse mode (or more pulses dependant on the inductor, output capacitance value, ESR, input and output voltages, and minimum off-time) as shown in FIG. 1D. Although unstable, the output voltage is still regulated, but the voltage ripple is two times bigger than in a stable system. Other undesirable characteristics of this instable operation are: reduced transient performance, increased Electro-Magnetic Interference (EMI), and increased power loss.

This problem is typically unique to comparator based control systems. Oscillator based voltage mode PWM control has at least two zeros to compensate for the phase lag. Oscillator based Current mode control reduces the number of system poles by sensing a switch or an inductor current in order to simplify the compensation but at the expense of additional circuitry.

As discussed above, COT control systems can have an output capacitor with a sufficient ESR to dominate the output ripple so as to ensure system stability. Effectively, the ESR zero is at a low enough frequency to eliminate the phase lag caused by the LC network and guarantees the system stability as shown in FIGS. 1A and 1C.

Figure 1E:
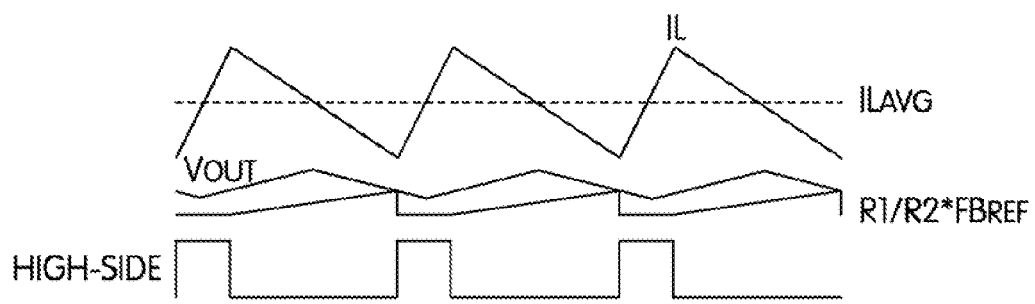

The present invention creates internal phase-lag compensation to stabilize the buck regulator system without requiring the use of a high ESR output capacitor. This phase-lag attempts to match the phase between the control loop and the phase lagged ripple voltage on the output. A PWM duty cycle dependent reference slope can be generated to fulfill this task as shown in FIG. 1E.

In FIG. 1B, the $FB_{ref}$ comes from a traditional band gap and is fixed during operation. However, in FIG. 1E, $FB_{ref}$ is a saw tooth waveform with its slope either proportional to duty cycle (D) for universal applications or fixed for a known phase lag system. This avoids turning on the high side control transistor during $V_{out}$ rising edge, and eliminates the possibility of double and multiple pulsing.

Figure 2:
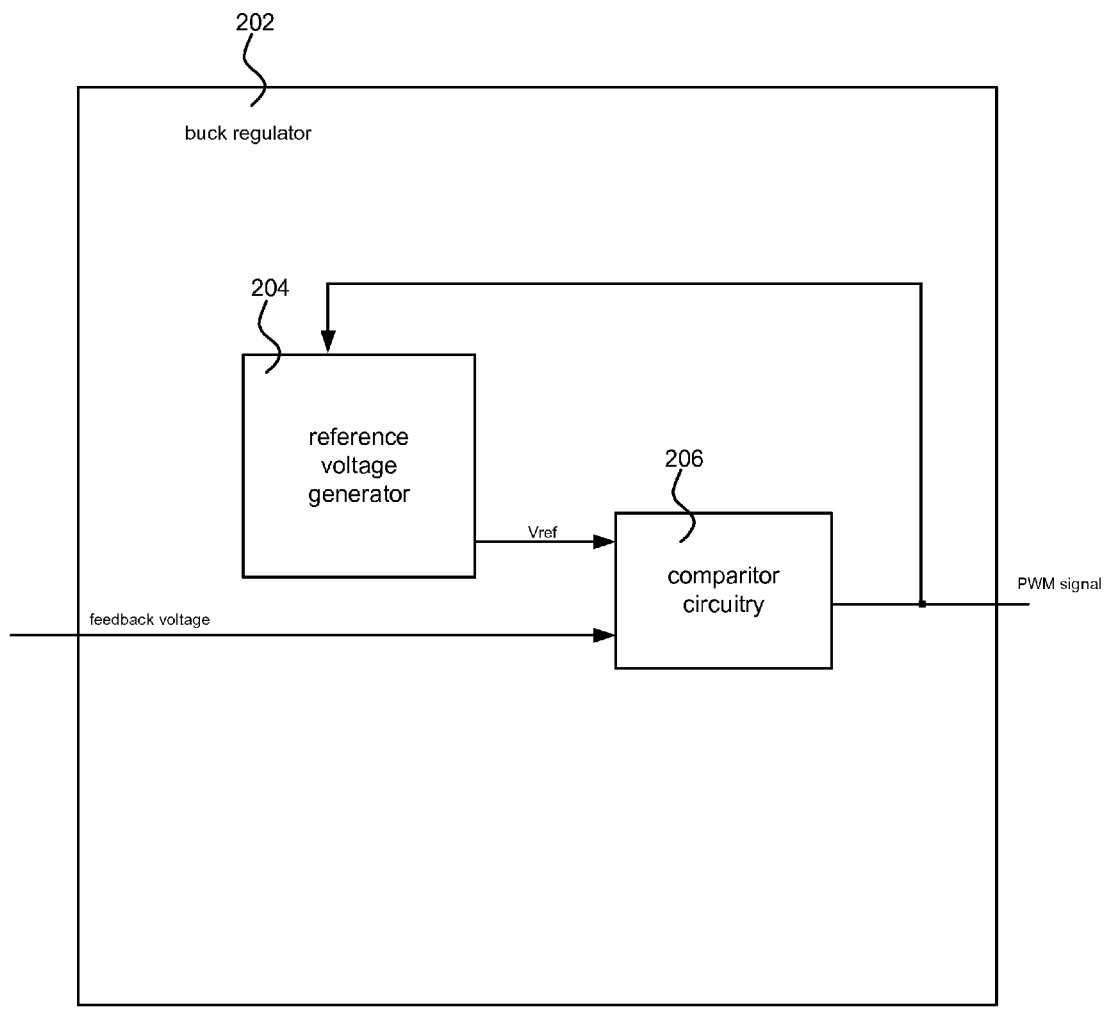
FIG. 2 shows an example of a reference voltage circuit of one embodiment of the present invention.

As shown in FIG. 2, an integrated circuit includes a buck regulator 202 using Constant On-Time control. The buck regulator 202 includes reference voltage generating circuitry 204 to produce a reference voltage value and comparison circuitry 206 to produce a PWM signal. In one embodiment, high side and low side PWM signals are created.

The comparison circuitry 206 receives the reference voltage from the reference voltage generating circuitry 204 and a feedback voltage from a feedback pin 208 of the integrated circuit 200. The reference voltage generating circuitry produces a reference voltage that varies within a PWM cycle and is adjusted based on features of the PWM cycle.

Figure 3:
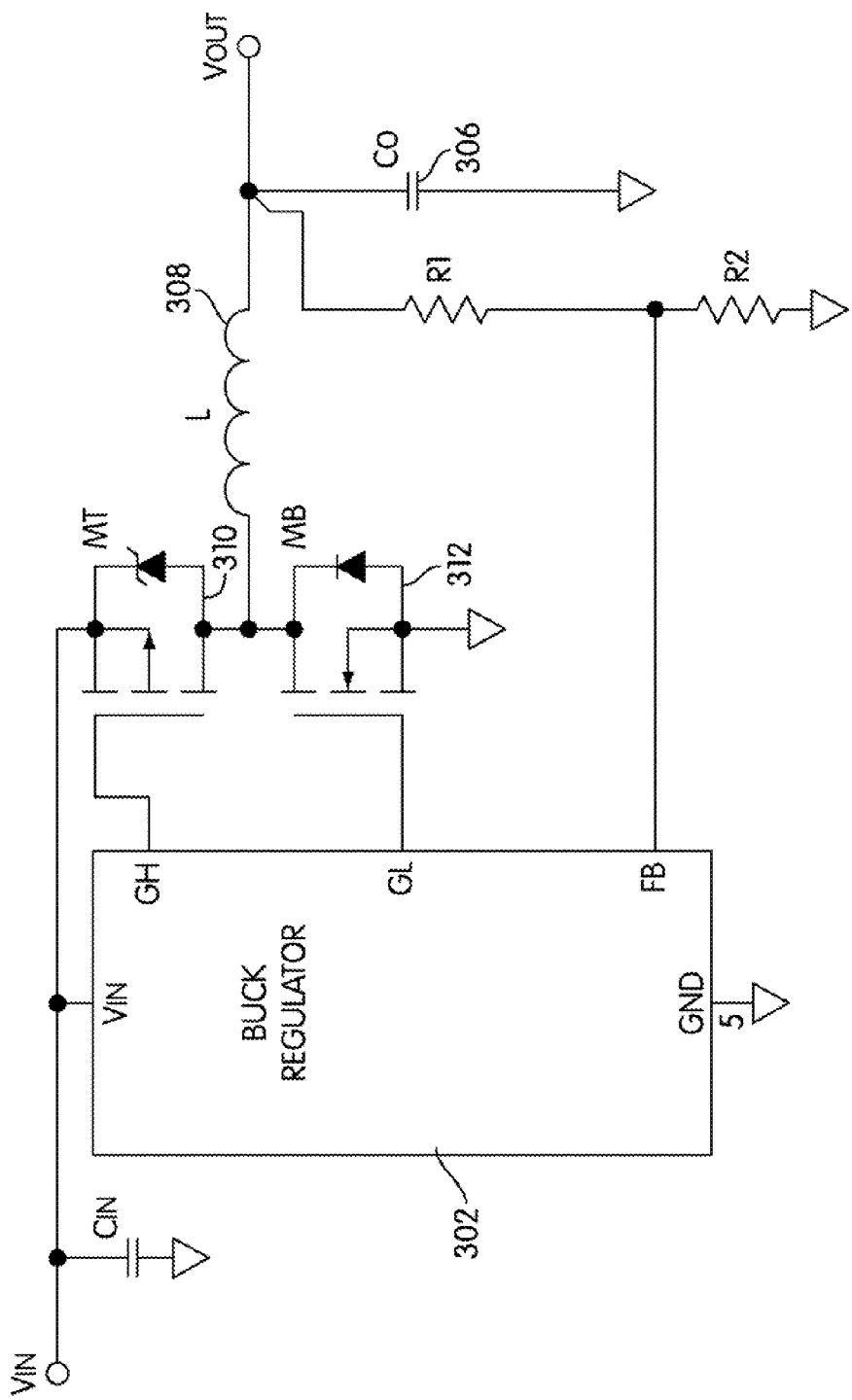
FIG. 3 shows an exemplary application of a buck regulator chip.

FIG. 3 shows an application for the buck converter 302. As shown in FIG. 3, an external LC circuit including an inductor 308 and output capacitor 306 creates a low pass filter used to produce the DC output voltage. A voltage divider including resistors R1 and R2 is connected to the output voltage to create the feedback voltage for the feedback pin of the integrated circuit. In FIG. 3, the high-side switch 310 and the low-side switch 312 are used to switch between the input voltages and ground into the LC circuit to produce the output voltage.

The output capacitor 306 is a ceramic capacitor with an ESR of less than 15 milli-ohms. The reference voltage generator circuitry stabilizes the constant on-time control even with the low ESR of a ceramic capacitor.

FIGS. 4A-4C, FIGS. 5A-5C and FIGS. 6A-6C show different embodiments of a reference voltage generating circuit of the present invention.

Figure 4A:
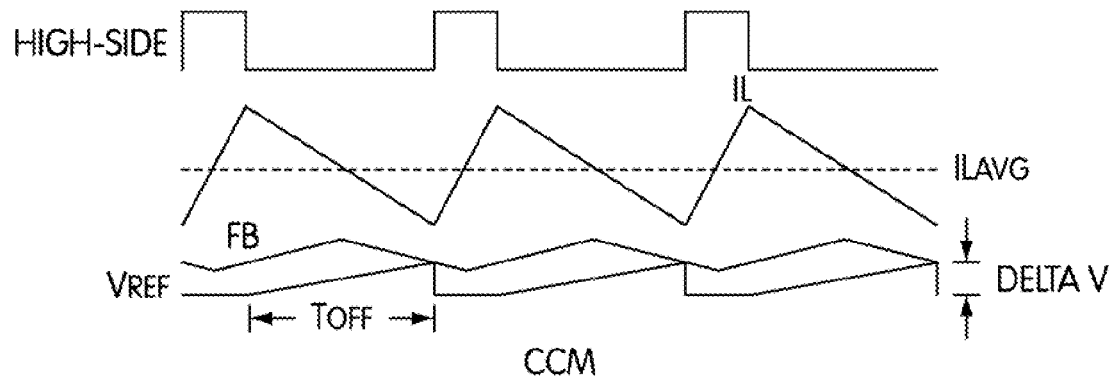
FIGS. 4A-4C show a reference voltage system of one embodiment of the present invention that uses a ramping voltage for the reference voltage within a portion of the Pulse Width Modulation (PWM) cycle to provide for stable Constant On-Time (COT) control.
Figure 4B:
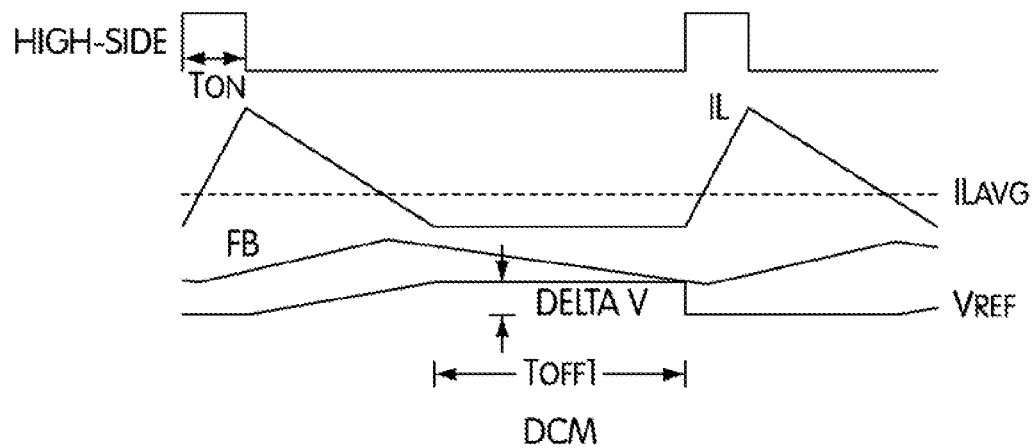
Figure 4C:
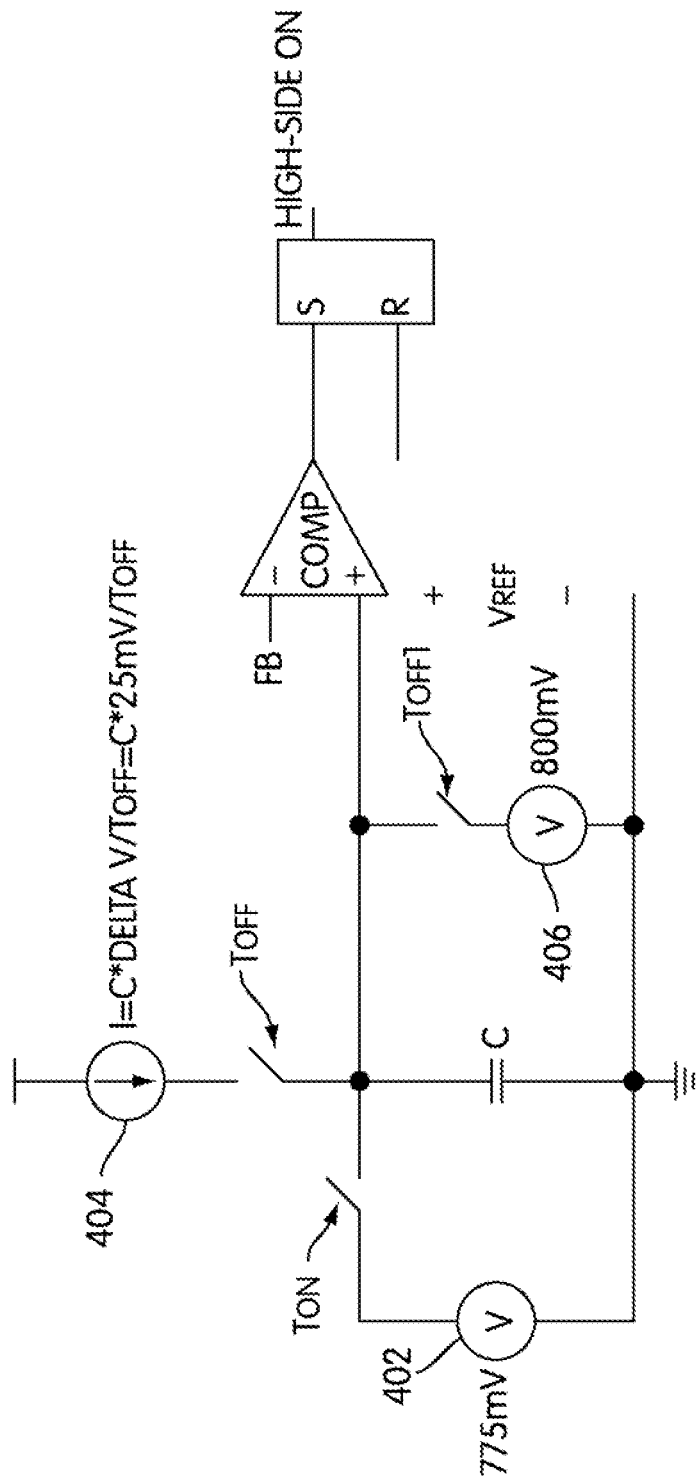

FIGS. 4A-4C show a first embodiment of a reference voltage generating circuit using ramp voltage. As shown in FIG. 4C, the reference voltage is created by switching in a first voltage (775 mV) at time $T_{on}$, when the PWM signal goes high. At time $T_{off}$, when the PWM signal goes low, current source 404 with a ramp function is used.

FIG. 4A shows a Continuous Condition Mode (CCM) example where the inductor current does not go to zero. FIG. 4B shows a Discontinuous Conduction Mode (DCM) example where the inductor current does go to zero.

At $T_{off}$, as shown in FIG. 4C, the voltage source 406 is switched into circuit to produce the reference voltage.

Figure 7:
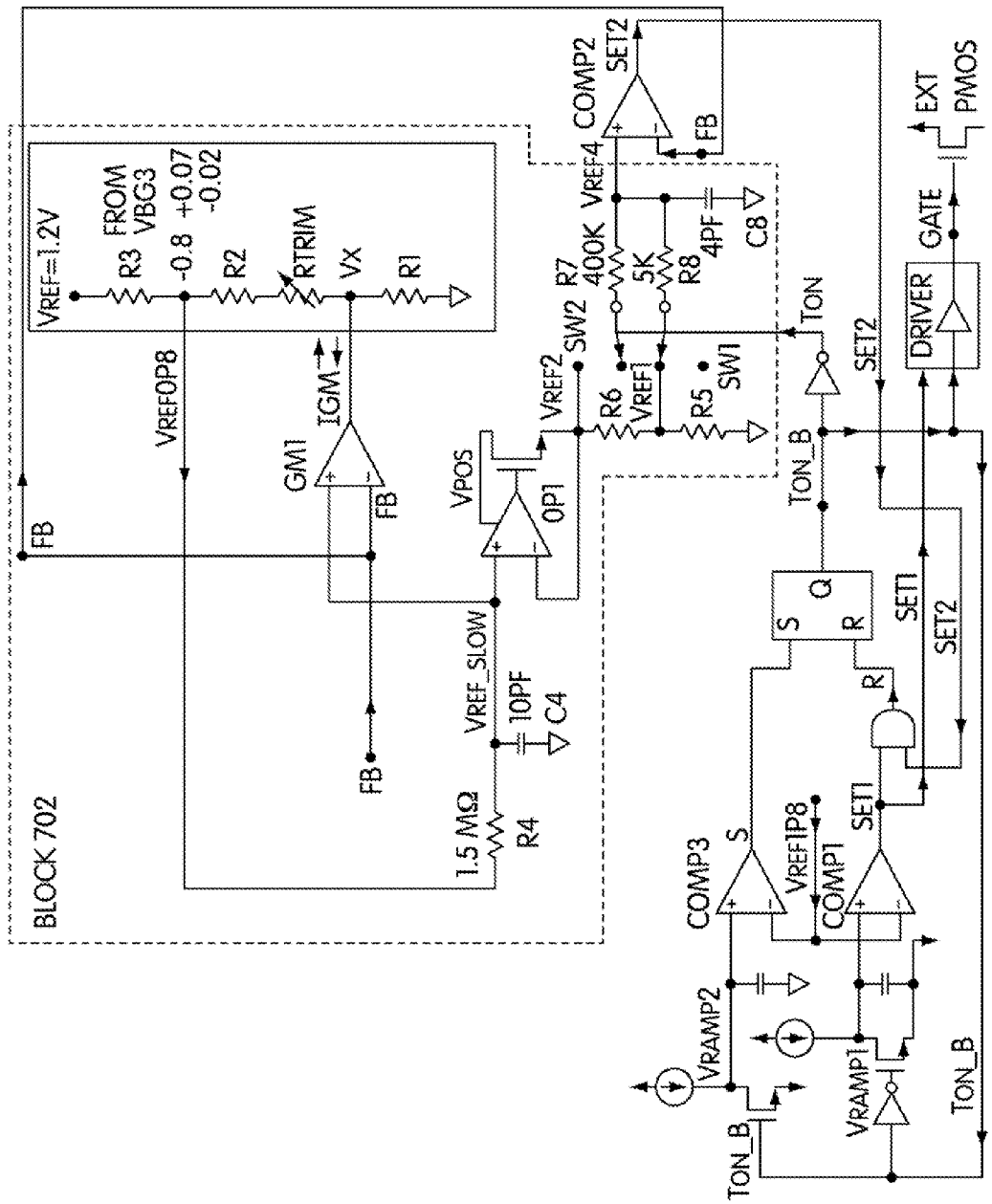
FIG. 7 shows an additional embodiment where a block is used to adjust the peaks and valleys of the reference voltage signal based on a feedback voltage.

If the output voltage ripple is set to be 3% peak-to-peak, assuming reference voltage is 800 mV, then the $V_{ref}$ valley can be set as 800 mV−(3%*800 mV)=776 mV. The charging current for a capacitor C connected to the current source can be designed to be:

$I=C*dv/dt$ $I=C*24\ mV/T_{off}$ $I=C*24\ mV/(K1*(1/V_{IN}-1/V_{out}))$ $I=K2/(1/V_{IN}-1/V_{out})$ In the embodiment discussed with respect to FIG. 7 below 50 mV is used rather than 24 mV.

If $V_{out}$ is not available for the controller, the duty cycle signal D from the switching node, or the high side and low side control signal of the PWM signal can also be used to derive the charging current.

In a Discontinuous Conduction Mode (DCM), once $V_{ref}$ reaches 800 mV it is held at that level during the time $T_{off1}$, when the inductor current is zeroed.

In summary, the reference voltage is maintained at a lower value than the feedback ripple valley when the control switch is conducting, and then the reference voltage is ramped up during the off time, and crosses the feedback voltage at the target value. If the reference voltage crosses the feedback voltage higher or lower than the target, some correction circuitry may be used to compensate the slope of the valley voltage of the reference as embodied in FIG. 7.

Figure 5A:
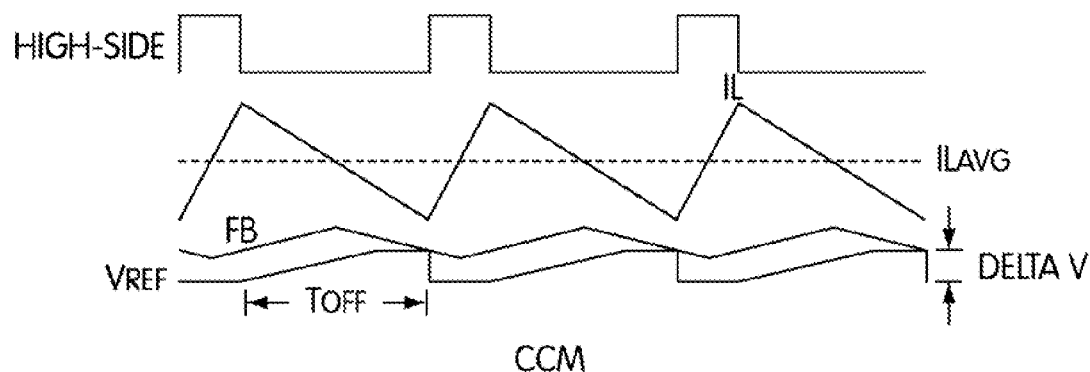
FIGS. 5A-5C shows a reference voltage system of one embodiment of the present invention that uses a Resistor-Capacitor (RC) circuit to create a reference voltage within a PWM cycle to provide for stable COT control.
Figure 5B:
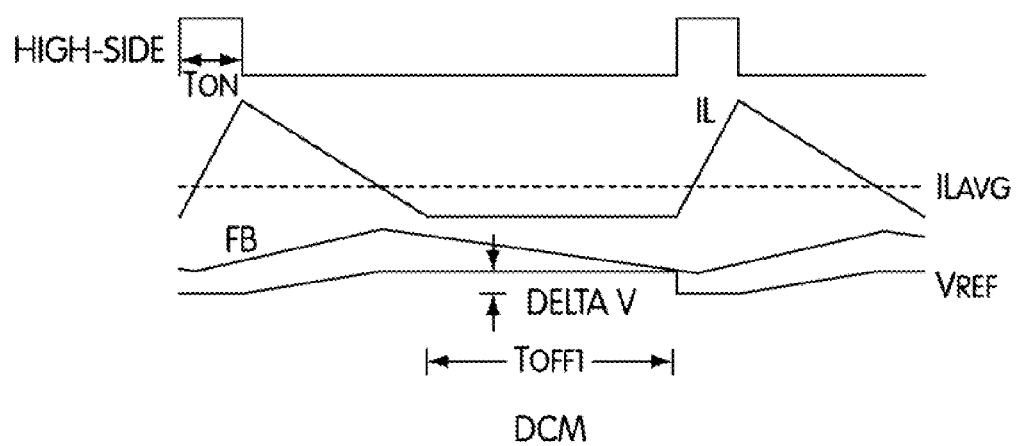
Figure 5C:
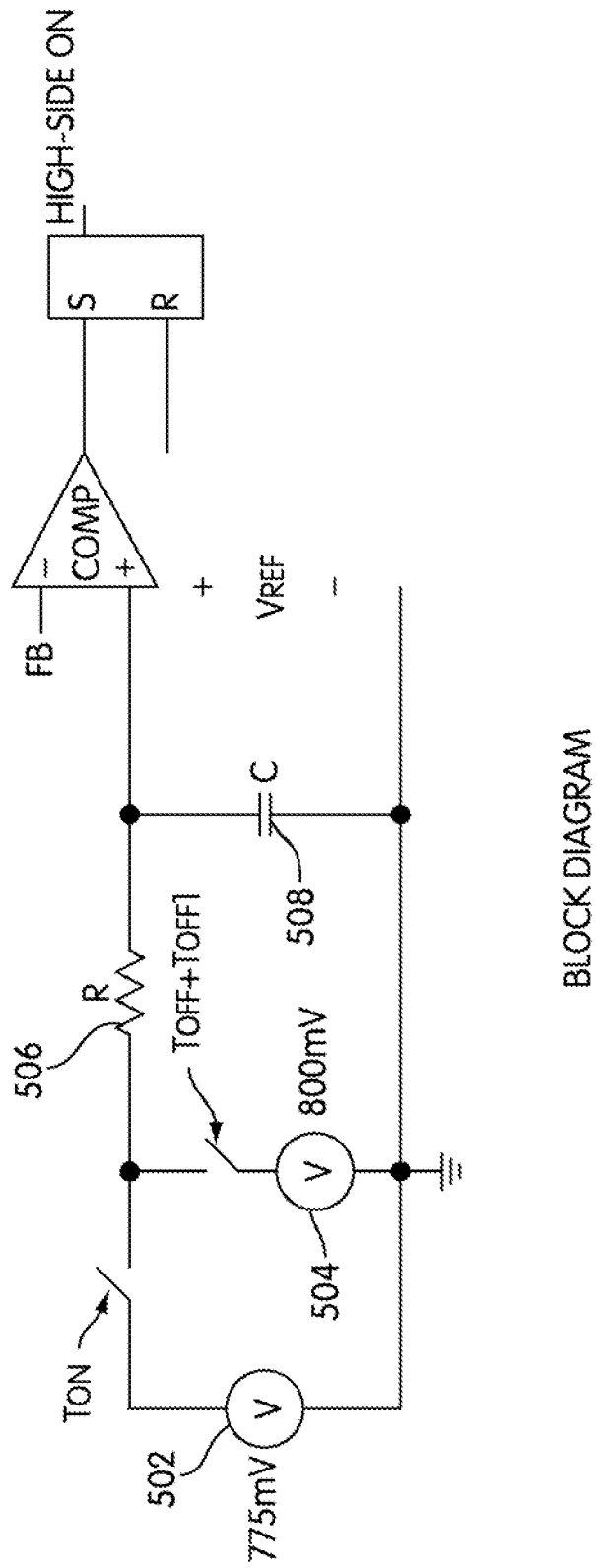

FIGS. 5A-5C shows a simplified control method using a reference voltage generating circuitry. As shown in FIG. 5C, first voltage source 502 and second voltage source 504 are alternately switched into a RC circuit comprising resistor 506 and capacitor 508 to produce the reference voltage. The first voltage source 502 is switched in when the PWM signal goes high and the second voltage source 504 is switched in when the PWM signal is low.

The example of FIGS. 5A-5C uses a RC circuit delay to generate the phase shifted reference slope. Compared with the example of FIGS. 4A-4C, this control method is simpler and has no difference between CCM and DCM operation.

This method has a fixed reference slope regardless the duty cycle of the buck regulator which means if the $V_{out}$'s rising edge is much slower than the reference RC circuit slope's rising edge, the system may again jump into instable regulation. Therefore, this embodiment requires a longer minimum off time. Another drawback of this method is an accuracy error of the system $V_{out}$. For different duty cycles, the feedback voltage might cross reference slope at different points during the RC circuit filter rising edge. The bigger the duty cycle, the larger the $V_{out}$ error will be. Therefore, compensation circuitry is needed if the buck regulator uses a high duty cycle.

Figure 6A:
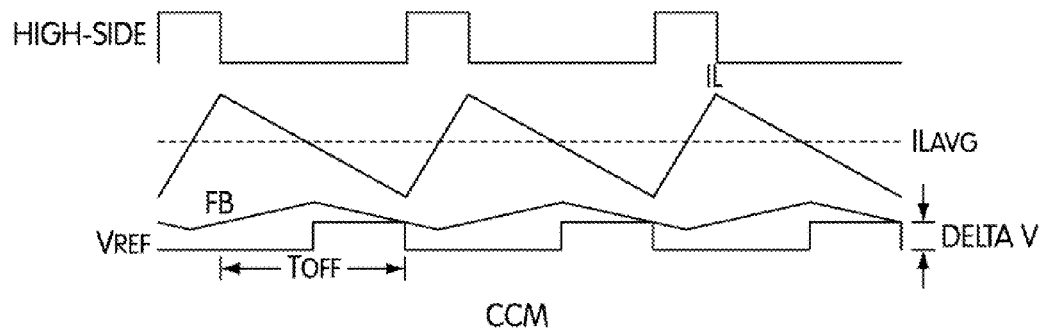
FIGS. 6A-6C shows a reference voltage system of one embodiment of the present invention that switches between two voltages within a PWM cycle to provide for stable COT control.
Figure 6B:
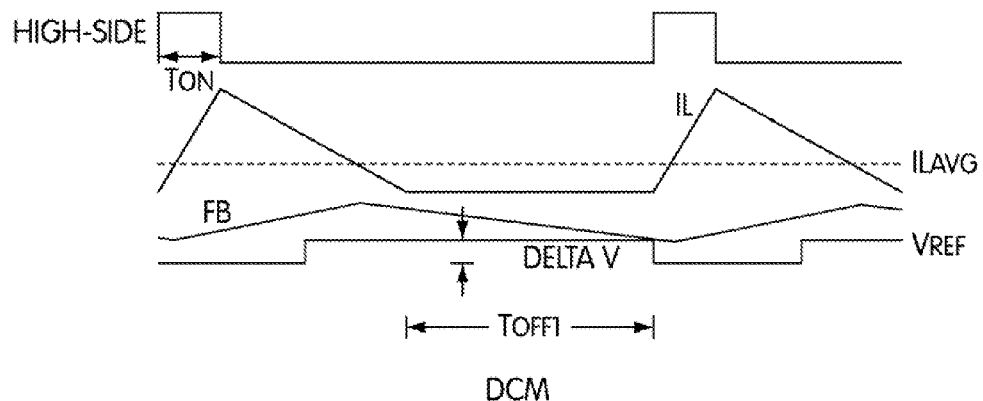
Figure 6C:
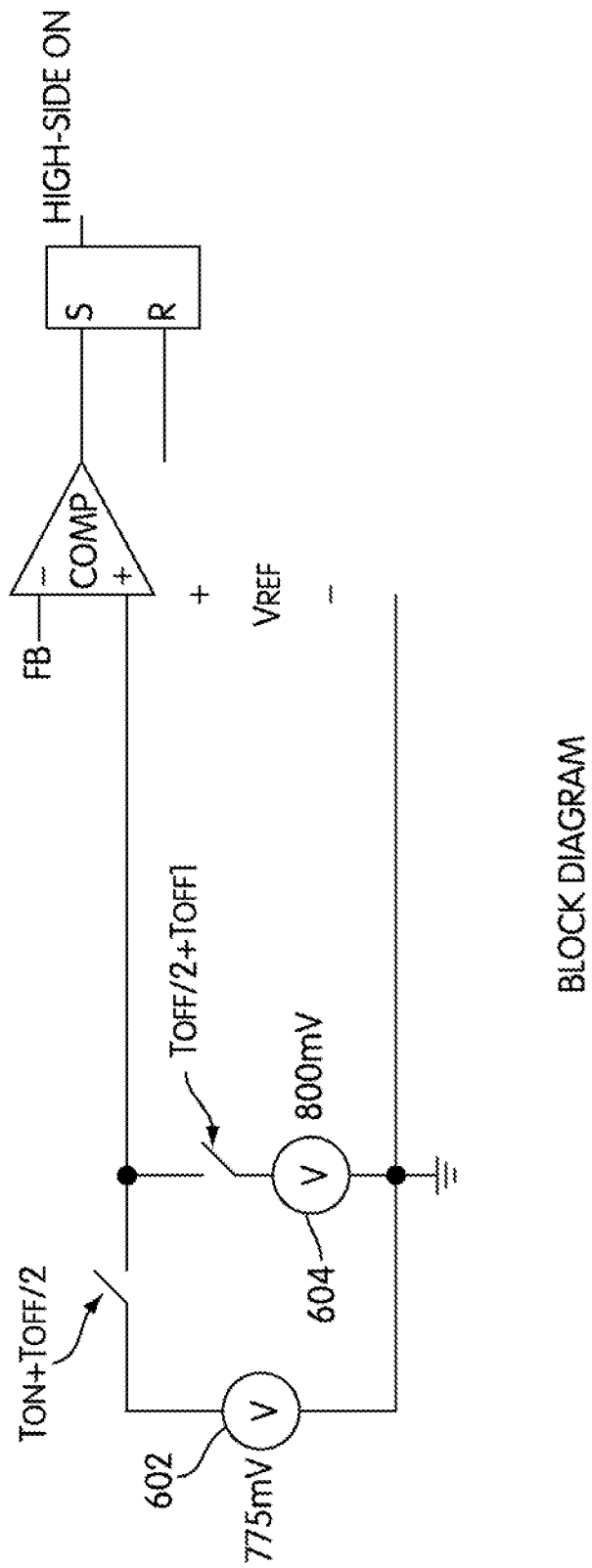

The example of FIG. 6A-6C is an even simpler method using reference voltage generating circuitry to switch between two constant voltages within the PWM cycle. As shown in FIG. 6C, voltage source 602 and voltage source 604 are switched in and out as the reference voltage, $V_{ref}$, without using a RC circuit. This method uses half of the $T_{off}$ period for the reference voltage to get back to a target value. The disadvantage of this method is that transient performance is a little slower than other methods; hence the output voltage overshoot is a little bit larger.

All three examples (FIGS. 4A-4C, FIGS. 5A-5C and FIGS. 6A-6C) described here solve the inherent instability in COT buck regulator systems with where low ESR of the output capacitor results in a heavily phase shifted output voltage. These control methods work equally well when using capacitors with higher ESR.

As described above, the adjusting of the reference voltage requires no direct sensing of the inductor current. The publication "Emulated Ripple Technique Advances Hysteric Switchmode Supplies" describes a prior system that operates in a current mode that requires sensing the external inductor current ramp current with the buck regulator chip. The current mode control scheme of this prior art system can be relatively complex and depending on the design, may require an additional pin to connect to the sensed current value.

$T_{off1}$, the time when the inductor current is zeroed, can be used for DCM operation as described above, but the determination of $T_{off1}$ does not require sensing the external inductor current. The $T_{off1}$ value can be derived from chip internal control information.

In systems where the input and output voltages are not directly sensed and a fixed reference slop is used, the output voltage will vary as duty cycle changes. FIG. 7 shows an embodiment where the voltages of the peaks and valleys of the $V_{ref}$ signal ($V_{ref4}$) at the comparator COMP2 are adjusted using block 702 rather than the $V_{ref}$ signal merely switching between two fixed voltage values. $V_{ref2}$ and $V_{ref1}$ define the peaks and valleys of the reference voltage signal ($V_{ref4}$) at the comparator COMP2. $V_{ref2}$ (and thus $V_{ref1}$) are set by the operation of the low pass filter (including the resister R4 and capacitor C4) and the transconductance amplifier GM1. Alternately, a voltage error amplifier can be used in the place of the transconductance amplifier GM1.

The transconductance amplifier GM1 compares the voltage between the output VREF_SLOW of the low pass filter and the feedback signal FB, and generates a directional current IGM which is proportional to the difference between VREF_SLOW and FB. If FB<VREF_SLOW, then the current IGM flows out from the transconductance amplifier GM1, and voltage $V_x$ increases which in turn causes VREF_SLOW, $V_{ref2}$ and $V_{ref1}$ to increase. If FB>VREF_SLOW then the current IGM flows out into the transconductance amplifier GM1, and voltage $V_x$ decreases which in turn causes VREF_SLOW, Vref2 and Vref1 to decrease.

Thus, block 702 adjusts the average value of $V_{ref4}$ at comparator COMP2 and corrects for propagation delays and offsets at the comparator COMP2. This has the benefit of improving system regulation accuracy.

TON_B is a digital signal which can be Low or High. If TON_B is low then the GATE is low which turns on the external PMOS. If TON_B is low then TON is high and the switch SW1 connects to $V_{REF1}$, and $V_{REF4}$ will be discharged to $V_{REF1}$ through R8. If TON_B is high then GATE is high which turns off the external PMOS. If TON_B is high then TON is low, the switch SW2 connect to $V_{REF2}$, and $V_{REF4}$ will be charged to $V_{REF2}$ though R7. $V_{REF4}$ ramps up and down between $V_{REF2}$ and $V_{REF1}$. $V_{REF2}$ is equal VREF_SLOW, and $V_{REF2}$ is equal $V_{REF1}$ plus 50 mV.

The foregoing description of preferred embodiments of the present invention has been provided for the purposes of illustration and description. It is not intended to be exhaustive or to limit the invention to the precise forms disclosed. Many embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalents.

The invention claimed is:

1. An integrated circuit including a buck regulator using Constant On-Time (COT) control comprising:
   reference voltage generating circuitry to produce a reference voltage; and
   comparison circuitry to produce a Pulse Width Modulation (PWM) signal, the comparison circuitry receiving the reference voltage from the reference voltage generating circuitry and a feedback voltage from a feedback pin of the integrated circuit;
   wherein the reference voltage generating circuitry produces a reference voltage that varies within a PWM cycle of the PWM signal; and
   wherein the reference voltage generating circuitry adjusts the reference voltage based on features of the PWM cycle.

2. The integrated circuit of claim 1, wherein the reference voltage generator circuitry does not use a sensed ramp portion of an external inductor current to adjust the voltage reference.

3. The integrated circuit of claim 1, wherein the reference voltage ramps up during at least a portion of PWM cycle.

4. The integrated circuit of claim 3, wherein the reference voltage ramps up when the PWM signal is low.

5. The integrated circuit of claim 3, wherein in a Discontinuous Conduction Mode (DCM) mode, the reference voltage is constant when an inductor voltage goes to zero.

6. The integrated circuit of claim 1, wherein the reference voltage generator circuit includes a Resistor-Capacitor (RC) circuit.

7. The integrated circuit of claim 6, wherein the reference voltage generator circuitry switches different voltages into the RC circuit to produce the reference voltage.

8. The integrated circuit of claim 1, wherein the reference voltage generator circuitry switches between two voltage values.

9. The integrated circuit of claim 8, wherein the two voltage values are adjusted up or down based on the feedback voltage.

10. The integrated circuit of claim 9, wherein the two voltage values are adjusted up or down using a block including a low pass filter and a transconductance amplifier or voltage error amplifier.

11. The integrated circuit of claim 8, wherein the switching between two voltage values occurs at the stop of a high and within a low of the PWM signal.

12. The integrated circuit of claim 1, wherein the reference voltage is adjusted in a voltage mode without using current information.

13. A system comprising:
   comparison circuitry to produce a Pulse Width Modulation (PWM) output, the comparison circuitry receiving the reference voltage from the reference voltage generating circuitry and a feedback voltage from a feedback pin of the integrated circuit; wherein the reference voltage generating circuitry produces a reference voltage that varies within a PWM cycle of the PWM signal;
   wherein the reference voltage generating circuitry adjusts the reference voltage based on features of the PWM cycle;
   an external inductor and output capacitor forming a LC circuit for the output voltage and a voltage divider connected to the output voltage to create the feedback voltage for the feedback pin of the integrated circuit; and
   wherein the output capacitor is a ceramic capacitor with an Equivalent Series Resistance (ESR) of less than 15 milliohms, and the reference voltage generator circuitry adjusts the reference voltage so as to stabilize output voltage for constant on-time control.

14. The system of claim 13, wherein the reference voltage generator circuitry does not use a sensed ramp portion of an external inductor current to adjust the reference voltage.

15. The system of claim 13, wherein the reference voltage ramps up during at least a portion of PWM cycle.

16. The system of claim 15, wherein the reference voltage ramps up when the PWM signal is low.

17. The system of claim 15, wherein in a Discontinuous Conduction Mode (DCM) mode, the reference voltage is constant when an inductor voltage goes to zero.

18. The system of claim 13, wherein the reference voltage generator circuit includes a Resistor-Capacitor (RC) circuit.

19. The system of claim 18, wherein the reference voltage generator circuitry switches different voltages into the RC circuit to produce the reference voltage.

20. The system of claim 13, wherein the reference voltage generator circuitry switches between two voltage values.

21. The system of claim 20, wherein the two voltage values are adjusted up or down based on the feedback voltage.

22. The system of claim 21, wherein the two voltage values are adjusted up or down using a block including a low pass filter and a transconductance amplifier or voltage error amplifier.

23. The system of claim 20, wherein the switching between the two voltage values occurs at the stop of a high and within a low of the PWM signal.

24. The system of claim 13, wherein the reference voltage is adjusted in a voltage mode without using current information.

* * * * *